United States Patent [19]

Flamenbaum et al.

[11] 3,806,570
[45] Apr. 23, 1974

[54] METHOD FOR PRODUCING HIGH QUALITY FUSED SILICA

[75] Inventors: Joel S. Flamenbaum; Peter Charles Schultz; Francis W. Voorhees, all of Painted Post, N.Y.

[73] Assignee: Corning Glass Works, Corning, N.Y.

[22] Filed: Mar. 30, 1972

[21] Appl. No.: 239,742

[52] U.S. Cl. .................... 264/66, 264/81, 264/332
[51] Int. Cl. .............................................. F27b 9/04
[58] Field of Search ............ 264/66, 81, 332; 65/18

[56] References Cited
UNITED STATES PATENTS

| | | | |
|---|---|---|---|
| 3,619,440 | 12/1969 | Gray | 264/332 |
| 2,272,342 | 2/1942 | Hyde | 264/332 |
| 3,644,607 | 2/1972 | Roques et al. | 264/332 |
| 3,576,932 | 4/1971 | Biddulph | 264/332 |
| 3,620,702 | 11/1971 | DeKalb et al. | 264/332 |
| 3,620,704 | 11/1971 | Gray | 264/332 |
| 2,326,059 | 8/1943 | Nordberg | 106/52 |

*Primary Examiner*—Donald J. Arnold
*Attorney, Agent, or Firm*—Walter S. Zebrowski

[57] ABSTRACT

There is disclosed a method and apparatus for providing optically pure water-free fused silica blanks, tubing and crucibles for use in forming optical waveguides, lenses, prisms, filters, and high temperature lamp envelopes, in which soot is deposited on a high purity graphite bait or refractory low expansion glass, glass-ceramic or suitable crystalline ceramic bait by a flame hydrolysis method in which the burner is located close to the bait. This results in an exceptionally dense soot preform. The preform is later sintered in an inert dry atmosphere by slowly inserting the soot covered bait into a furnace in such a manner that entrapped gas is forced from the fused silica during the slow insertion into the furnace maintained at a temperature above 1,400°C. The formation of bubbles within the fused silica is prevented because of the inert atmosphere and because the gases in the preform escape through the unsintered portions of the preform, thereby providing a crucible or blank of fused silica of exceptionally high optical quality.

14 Claims, 5 Drawing Figures

SOOT DEPOSITION

INDUCTION SINTERING

METHOD FOR PRODUCING HIGH QUALITY FUSED SILICA

BACKGROUND OF THE INVENTION

This invention relates to a method and apparatus for producing water-free, high optical quality fused silica in the form of blanks from which can be made high quality optical waveguides, lenses, prisms, and filters. The fused silica can also be made in the form of crucibles and tubing for high temperature lamp envelopes. More particularly, this invention relates to a method utilizing a single bait of high purity graphite or refractory low expansion material in combination with a closely spaced flame hydrolysis burner which produces a dense soot preform on the bait. The preform is then slowly inserted into a sintering furnace using an inert atmosphere which permits entrapped or entrained gas to escape through the soot.

For the purposes of this application, the term "fused silica" refers to an amorphous form of $SiO_2$, however the amorphous form is obtained. The term "vitreous silica" is used in this application to be synonomous with "fused silica."

PRIOR ART

The production of water-free, high quality, high purity, vitreous silica is important in optics because of the new uses to which high optical quality fused silica can be put. It has recently been found that fused silica can be used to advantage in the production of low attenuation optical waveguides which heretofore have not been satisfactorily formed with glass materials. In addition, because of this high quality, fused silica is finding greater application in the formation of lenses, prisms and indeed many optical applications. The subject invention is a modification of the flame hydrolysis process used in the past to produce fused silica crucibles or blanks. This is described in part in U.S. Pat. No. 2,326,059, issued to M. E. Nordberg, Aug. 3, 1943. In this earlier process, fused silica crucibles are produced by depositing $SiO_2$ soot from a natural gas and oxygen flame onto a rotating metal mandrel. When a sufficient thickness is formed, the metal mandrel is removed and the preform sintered in an oxidizing atmosphere. This results in undue shrinkage, deformation and cracking. In a known adaptation of the Nordberg process, an air cooled aluminum mandrel is used. When a sufficient soot thickness is developed on the aluminum mandrel the soot "preform" is removed from the aluminum mandrel, placed over a smaller graphite mandrel having the final dimensions of the crucible and then placed in a preheated furnace at approximately 1,500°C. for approximately 30 minutes. The atmosphere in this adaptation of the Nordberg process is a reducing atmosphere of cracked ammonia or forming gas. During the heat treatment, the soot is sintered. At this time it consolidates into a reasonably clear glassy body. Considerable shrinkage of the body occurs during this sintering operation. The shrinkage in this prior art process can be as much as 50 percent. This causes the preform to collapse tightly onto the underlying graphite mandrel. Upon removal from the furnace, the cooled crucible is removed from the graphite mandrel upon which it has been sintered. The resultant fused silica crucible is to a certain extent water-free ($\beta_{OH}$ approximately equal to 0.02) and is in general of high purity. However, it contains many small gas bubbles and opaque inclusions which are zones of unconsolidated soot. In addition, only very small crucibles can be produced. These crucibles in general have thicknesses on the order of 2 mm with 5 cm outside diameters and 5 cm heights. Thicker and larger crucibles are very difficult to produce by this method. Most of the larger crucibles produced by this prior art method crack off the aluminum mandrels during soot deposition due to uneven cooling of the high expansion mandrel or crack due to large shrinkage during sintering. In addition, after the sintering operation, larger crucibles result in the same poor quality blanks found for the smaller size crucibles. Thick wall pieces could not be made due to considerable cracking during soot deposition.

SUMMARY OF THE INVENTION

The present method and apparatus result in large crucibles and blanks which are both water-free and of high optical quality. In addition and more importantly, both the aforementioned gas bubbles and the opaque inclusions are eliminated. This is especially important because the blanks are used in the production of optical waveguides. It is important in the production of optical waveguides that the fused silica be exceptionally pure and of high optical quality so that attenuation in the waveguides due to absorption and scattering by the glass is kept to a minimum. Using glass blanks made by this process, waveguides of up to a kilometer have been produced with attenuations lower than 20 db per kilometer for most useful wavelengths.

In general, the present invention involves a modification of the above described process in that a single mandrel is used, a close relationship between mandrel and burner is maintained and an inert sintering atmosphere is used. Further, either high purity graphite or refractory ceramic mandrels are used rather than the prior art metal mandrels. This results in bubble-free and water-free fused silicas of extremely high optical quality in which blanks of much larger dimension than previously thought possible are made. For example, crucibles of 3 mm wall thicknesses having 12 cm outside diameters and 12 cm heights have been successfully produced by the subject method and apparatus. Further, tubes of 24 cm lengths having 3 cm outside diameters and 12 mm wall thicknesses have also been produced by the subject method and apparatus. Round and square tubing has also been produced.

According to this invention, $SiO_2$ soot or doped soots if desired are deposited by flame hydrolysis of $SiCl_4$ or $SiCl_4$ plus a dopant halide onto a rotating and translating mandrel in a fashion similar to the previously described process. However, by using a rather intense flame, and by maintaining a small distance between the burner and the mandrel, soots are deposited which are in an extremely hard state of compaction. These soots, therefore, tend to remain uncracked and tend not to peel from the mandrel even when thick layers on the order of 1 inch or more are deposited. In this invention, only one mandrel is used and the problems of mandrel expansion involving cooling aluminum with air in the old process are eliminated by using a high purity graphite mandrel at the outset. This also minimizes the amount of handling required and associated introduction of contamination. Since the expansion of graphite is quite low ($\alpha_{o-1,000} \cong 30 \times 10^{-7}/°C$) there is no need for careful internal cooling to maintain dimensional stability during the soot deposition step. The mandrel may be in the shape of a rod, but a mandrel shaped like crucibles with rounded or flat bottoms have also been used with equal success. In addition, by using hot close flames with graphite mandrels, it is possible to build up very thick layers of soot. In an alternate embodiment, low expansion, high temperature glass mandrels of "fused quartz" or other low expansion refractory glasses, glass-ceramics, or crystalline ceramics can also be used with equal success. However, the final heat treated sample is generally tightly bonded to these mandrels and must be removed by cutting, grinding or preferential etching away of the mandrel.

The highly compacted soot on the mandrel is called a "preform" and is subjected to a unique sintering step in which the soot is consolidated to form a clear glass. Unlike the prior art process, where the soot preform is transferred to a smaller graphite mandrel, the present invention takes advantage of "gradient sintering" which functions similar to zone refining. In the subject invention, the soot preform is left on the original mandrel on which it was deposited. This preform is slowly passed into the hot zone of a tube furnace. An induction furnace is particularly suitable and temperatures on the order of 1,400°–1,700°C. are maintained in the hot zone. An inert dry atmosphere of, for instance, nitrogen, helium, neon or argon is also maintained to avoid oxidation of the graphite mandrel. This inert gas also replaces trapped air in the preform and subsequently dissolves in the glass. This is unlike the oxidizing or reducing atmospheres of the prior art.

The reducing atmosphere used in the prior art was cracked ammonia or forming gas which is a mixture of nitrogen and hydrogen. This cannot be used because the silicon would be reduced and the glass formed thereby would not have the desired transmission characteristics. The Nordberg oxidizing atmosphere, on the other hand, could not be used with graphite mandrels because the graphite mandrel would be destroyed during the consolidation process thus leaving a tremendous number of bubbles and inclusions in the glass. It should be noted that neither oxygen nor reducing gases will dissolve readily in the glass.

However, inert gases such as helium, neon, argon or nitrogen (or the other inert gases) will dissolve in glass and will not attack the mandrel. As the preform is gradually inserted into the furnace it generally has air trapped in it. As it moves into the furnace this air is replaced by the atmosphere of the furnace. All gases not forced out by the slow insertion are then very easily dissolved in the glass during consolidation or sintering at for instance 1,600°C. Thus a bubble free fused silica is formed.

As the preform is slowly passed into the hot zone at rates between 0.1 inches per minute to 1.0 inches per minute depending upon soot thickness, the hot end begins to consolidate and shrink first, causing the gases in that region of the preform to be squeezed out through the unconsolidated parts of the preform and escape the body. As the preform is plunged deeper into the hot zone, the consolidation and gas exhausting process continues until the preform is completely consolidated. It is then rapidly removed from the furnace. The resultant consolidated body is virtually free of any gaseous or particulate inclusions. The optically transparent blank thus formed does not rely on a subsequent heating step to obtain transparency. It is thought that the particular mandrel, the use of a single mandrel, the exceptionally dense preform, the gradient sintering due to slow insertion and the improved sintering atmosphere operate either separately or together to provide the much improved results. It will be appreciated that the preform can also be consolidated by passing it in an upward direction, or horizontally, into the hot zone with equal success.

It is therefore an object of this invention to provide an improved method and apparatus for providing a fused silica blank or crucible which is water-free, which is of high optical quality and chemical purity, and which can be made in large sizes.

It is another object of this invention to provide a method for forming water-free high purity fused silica crucibles or blanks by inserting an exceptionally dense preform made from flame hydrolyzed silicon tetrachloride into a high temperature furnace in such a manner that gas entrapped in the preform can either escape the preform or be dissolved therein.

It is yet another object of this invention to provide a single mandrel on which a flame hydrolyzed soot is deposited in a compacted dense configuration, which preform is then inserted slowly into a furnace so as to completely sinter the preform onto the mandrel and so as to permit the escape of a trapped gas.

It is a still further object of this invention to provide apparatus including a single mandrel and a closely spaced burner for a flame hydrolysis unit in addition to a tube furnace, in which soot is deposited on the mandrel, is compacted thereon and is slowly inserted into the tube furnace so as to produce a high quality water-free fused silica blank or crucible.

In accordance with this invention the subject method provides for fused silica blanks in which soot is deposited on a non-metal bait by a flame hydrolysis method in which the burner is located extremely close to the bait. This results in a dense soot preform. The soot is later sintered in an induction furnace by slowly inserting the soot-covered bait into the induction furnace in such a manner that entrapped gas is forced from the fused silica. The furnace is maintained at a relatively high temperature of between 1,400° and 1,700°C. and a dry inert gas is used for the atmosphere. The escaping gas prevents the formation of bubbles within the fused silica, thereby providing a crucible or blank of fused silica of exceptionally high optical purity.

Other objects and advantages will be better appreciated from the following drawings, description and appended claims.

DETAILED DESCRIPTION OF THE INVENTION

Figure 1:
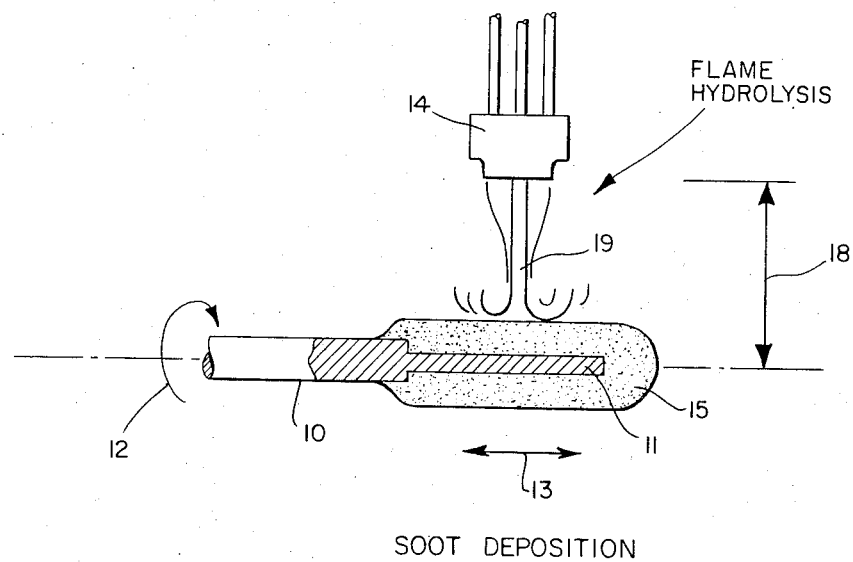
FIG. 1 is a diagram indicating a flame hydrolysis method for depositing soot on a rotating and translating mandrel.

Referring now to FIG. 1, a flame hydrolysis method of depositing soot on a mandrel is shown. In FIG. 1, a rotating mandrel 10 is provided with a narrow cylindrical extension 11 shown in cross-section. In one embodiment, the mandrel 10 is ≈ 14 mm O.D. and extension 11 is 3-5 mm O.D. × 9 inches long. The mandrel 10 is rotated in the direction of the arrow 12 and is translated in the direction of the arrow 13 in such a manner that soot formed by flame hydrolysis from the burner 14 is deposited as shown by the material 15 on the extension 11 of the mandrel 10. In general, the mandrel extension 11 is called the "bait." As mentioned hereinbefore, the mandrel is generally a graphite mandrel of high purity. High purity in the context of this invention refers to a grade of graphite having a maximum ash content of 0.01 percent. For ash content higher than 0.01 percent, outgasing occurs and addition of metal oxide impurities in the glass results. Also as mentioned hereinbefore, a low expansion, high temperature glass mandrel of fused quartz may be used. Such a mandrel can also be made out of VYCOR which is a trademark for a high silica ( > 98 percent) glass produced by Corning Glass Works of Corning, N.Y. In general, if the bait is not graphite, glass, or glass-ceramic, it can be any crystalline refractory ceramic which has a low expansion characteristic and is dense such as $Al_2O_3$, mullite, BN, SiC, etc. The soot 15 is deposited by flame hydrolysis of silicon tetrachloride to be described hereinafter and may be either doped or undoped. Dopants include but are not limited to zinc, tin, germanium, phosphorus, tantalum, titanium, aluminum, tungsten, molybdenum, beryllium and niobium. The burner 14 is in general positioned close to the mandrel 10 and is in general only 4-7 inches away from the mandrel as shown by the arrow 18. From the burner 14 is emitted a rather intense flame composed of 0.5 cfm. natural gas, 0.58 cfm. oxygen in one embodiment. The flame is shown diagrammatically by the reference character 19. With the burner on, the mandrel is rotated and translated so as to provide a uniform highly dense layer of soot as shown at 15. This soot may be accumulated to the thickness of as much as 1 inch or more on the mandrel 15 without peeling or cracking. As mentioned hereinbefore, peeling or cracking is eliminated because of the close spacing between the burner and the mandrel giving a dense (tightly bonded) soot deposition, because of the translation and rotation of the mandrel giving a uniform deposition and because, unlike prior art, the mandrel is made of a high purity graphite or low expansion refractory material which eliminates stresses caused by heating and cooling cycles.

The closeness of the burner to the mandrel refers to the relative position of the flame emitted. It will be appreciated that a typical natural gas/oxygen flame has an inner cone and an outer cone or tail part. In prior art systems the outer cone or tail part is fairly well removed from the mandrel. In the subject invention, however, the mandrel exists well within the outer cone of the flame. The density of the soot prevents a certain amount of shrinking of this material when it is sintered. Thus, in the prior art when 50 percent to 60 percent shrinkage is common, only ≈ 30 percent shrinkage is occasioned by the subject technique. The material 15 is referred to herein as the "preform."

Figure 2:
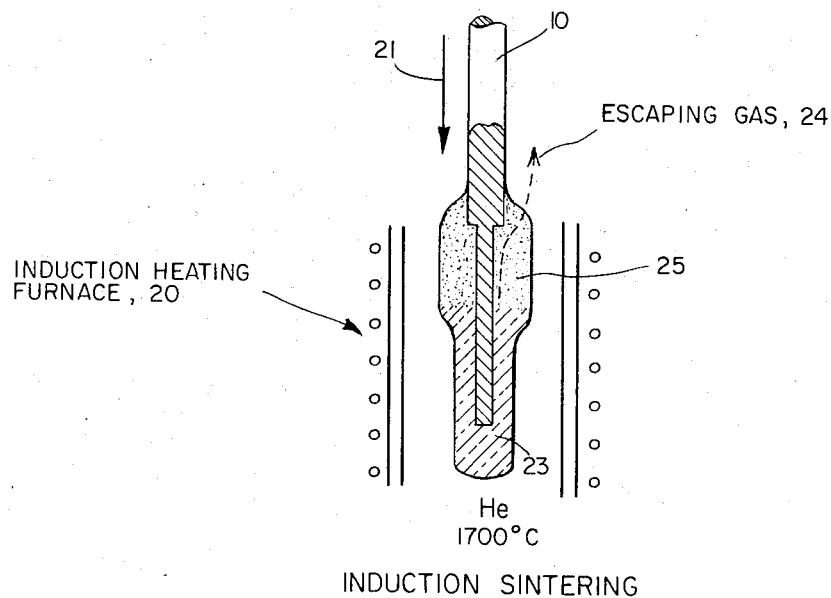
FIG. 2 is a diagram showing the slow insertion of the preform of FIG. 1 into an induction furnace for radiant induction sintering permitting the escapement of gas from the preform.

The mandrel with the preform thereon is inserted into an induction heating furnace 20 in the aforementioned inert atmosphere which is maintained generally between 1,400° and 1,700°C. As shown by the arrow 21, the mandrel 10 is inserted downwardly into the heating furnace 10. It is important and in fact critical that this insertion be relatively slow. By "relatively slow" is meant insertion rates between 0.1 inches per minute and 1.0 inches per minute depending upon soot thickness. An inert atmosphere, which in one embodiment is helium, is maintained in the furnace to prevent oxidation of the graphite mandrel 10 during the sintering process. During the sintering process, as shown in FIG. 2, as the mandrel is moved progressively inwardly of the heating furnace, the preform shrinks and forms a solid clear glass shown by the shading lines 23. The sintering is accomplished from one end to the other. This in effect squeezes out the entrapped gas in such a manner that the entrapped gas shown diagrammatically at 24 is forced out of the unsintered fused silica portion 25 as the preform is inserted into the induction heating furnace 20. After the preform is completely consolidated, it is quickly removed from the furnace. As mentioned hereinbefore, the resultant consolidated body is virtually free of any gaseous or particulate inclusions. It will be further appreciated that the preform and mandrel may be inserted into the furnace from any direction.

Figure 3:
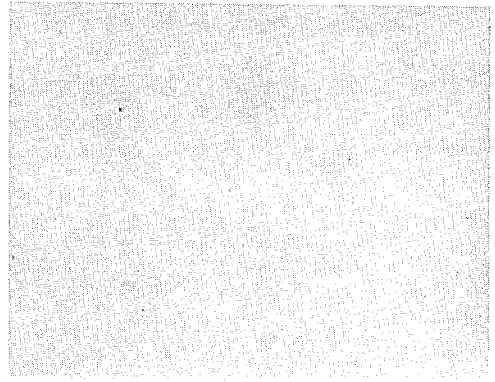
FIG. 3 is a photomicrograph showing a portion of the blank formed by the subject process indicating extremely few optical imperfections.
Figure 4:
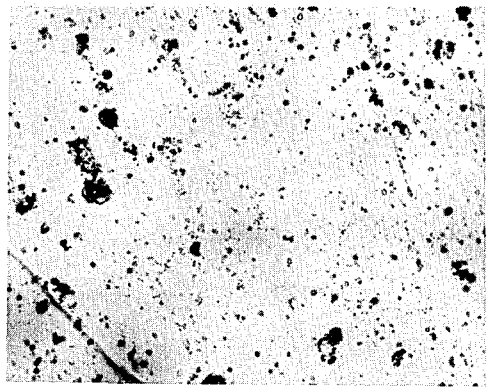
FIG. 4 is a photomicrograph of a blank taken from the prior art process showing the trapped bubbles and the entrained material.

FIGS. 3 and 4 are transmission photomicrographs of the typical blanks produced by the new and old processes. The improvement of the blank shown in FIG. 3 made by the subject process is immediately obvious from inspecting the blank of FIG. 4 made by the old process. The prior art process crucible as shown in FIG. 4 is 1.5 mm thick whereas that formed by the new process shown in FIG. 3 is approximately 18 mm thick. From inspection of these photomicrographs, it is obvious that there is a tremendous improvement in quality. As can be seen in FIG. 4, there are a large number of gaseous bubbles and particulate inclusions in the crucibles which are directly attributable to the way in which the crucible preform is made and then sintered. As can be seen from FIG. 3, there are no bubbles or inclusions trapped within the glass when using the subject slow insertion and high induction furnace temperatures with the above inert atmospheres and the single mandrel. It will be appreciated that slower insertion at temperatures just above 1,400°C. will also give these desired results.

It will be appreciated that since the preform is sintered on the same mandrel upon which it was originally deposited, there is no change in the internal dimensions of the finished body. The only shrinkage is in the wall thickness and this is only approximately 30 percent due to the harder packing of the soot during initial deposition. The use of a single mandrel throughout the process also eliminates any unwanted contamination associated with handling of the preform in transfer operations. This process has been used successfully with a variety of sizes and shapes. In all cases, the resultant fused silica bodies are of exceptionally high optical quality, high purity, and are water-free ($\beta_{OH}$ 0.01). Optical waveguide blanks (tubes having a 1 inch outside diameter, a ¼ inch inside diameter and a 4 inch length) have been made from pure fused silica made according to the subject process and have also been made of pure fused silica doped with titanium oxide in which the dopant is introduced in the burner 14 of FIG. 1. Also, cylindrical and square tubing 1 inch in diameter by 4 inches long by ¼ inch thick have been made of fused silica doped with a variety of oxides including $GeO_2$, $SnO_2$, $WO_3$, $MoO_3$ and $Ta_2O_5$ by the subject process. As mentioned hereinbefore, these blanks can be used for water-free fused silica lenses, prisms, filters, high temperature lamp envelopes, and tubing, in addition to their use in optical waveguides. Further, crucibles have also been produced which are 4½ inches in outside diameter by 6 inches high and with an ⅛ inch wall thickness by the subject process. They are excellent containers for silicon melts during the silicon crystal growing process used extensively by the electronics industry.

THE METHOD OF SOOT DEPOSITION

Figure 5:
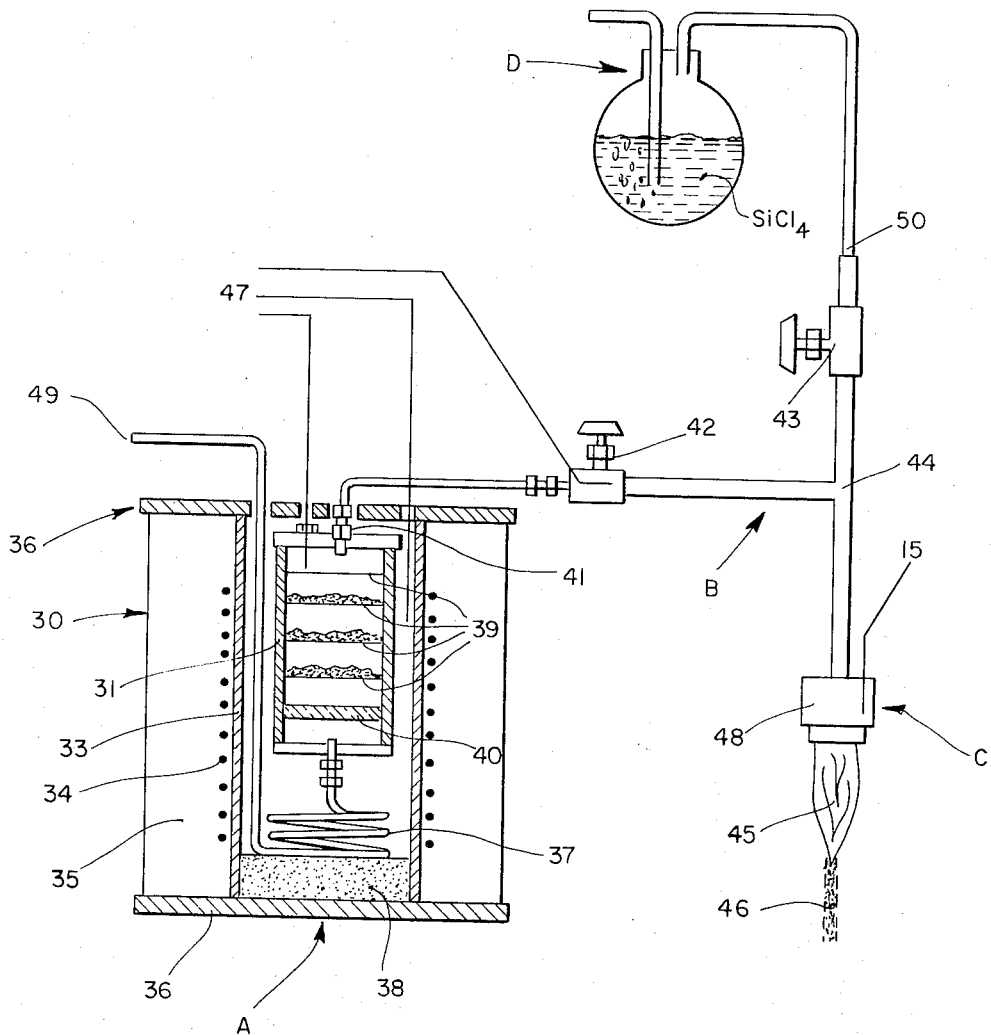
FIG. 5 is a schematic diagram of a flame hydrolysis unit for producing either doped or undoped soots on a mandrel.

Although several methods of soot deposition are described in the prior art, a brief description of one type of soot deposition is included to complete the description of the subject process. Basically, the process is one of flame hydrolysis in which a doped or undoped soot is formed. A cross-section of an apparatus for flame hydrolyzation is shown in FIG. 5 to be divided into four main sections A, B, C and D. Section A is a vapor generator for generating vapors of doping materials whose halide forms are solids at temperatures where their vapor pressure is ≈ 40 mm of Hg; B is a vapor delivery system into which both dopant vapors and $SiCl_4$ vapors can be mixed; and C is a gas oxygen burner used for the hydrolysis of the halide vapors formed. Apparatus for generating $SiCl_4$ vapor, which becomes the major part of the soot is shown at D. It is a relatively simple matter to obtain $SiCl_4$ vapor from liquid $SiCl_4$ by bubbling oxygen through the liquid. Dopants in vapor form from solid halide compounds (i.e., $ZrCl_4$, $TaCl_5$, $AlCl_3$, etc.) are somewhat more difficult to produce, and the apparatus shown in FIG. 5 is mainly included for its showing of the production of these dopant vapors.

The dopant vapor generator A consists of two main parts: tube furnace 30 and a generating chamber 31. The tube furnace consists of an inner refractory core 33 around which is wound an electrical heating element 34. This core is then surrounded by a suitable insulating material 35 and the entire system is enclosed in a stainless steel shell. The end of the tube furnace is enclosed by transite plates 36.

The generating chamber 31 is placed inside of the tube furnace and is constructed entirely of stainless steel, including tubing and fittings. Attached to the generating chamber is an inlet tube 37 through which the carrier gas enters the vapor chamber. This tube consists of a series of coils which allow the carrier gas to be preheated before entering the chamber. The coils also act as a support for the chamber and rest on refractory brick 38. The chamber itself consists of a stainless steel tube or shell 31 and end caps. The halide compound powder, for example, zirconium tetrachloride, is placed onto a series of stainless steel screens 39.

In the preferred embodiment, these screens are 100 mesh, and the screens are completely covered with material. The uppermost screen is left uncovered and acts as a filter to keep solid materials from passing through the upper section of the chamber, and thus into the delivery system. In a preferred embodiment, a 30 micron porous nickel plate 40 is placed below the lowest screen and evenly disperses the incoming carrier gas over the cross-sectional area of the chamber. This insures a maximum amount of contact between the carrier gas and the halide powder. The screens and porous nickel plate are separated in the chamber by means of stainless steel ring bushings (not shown) placed between them. Screens and plate completely fill the cross-sectional area of the chamber to eliminate any carrier gas from passing around them rather than through them. The halide powder is loaded onto the screens by unscrewing the chamber lid and placing one loaded screen in at a time. Spacer bushings (not shown) are placed between each screen and the lid is tightened securely. Silicone rubber O-rings (not shown) are used on the lid and end cap to maintain a gas tight seal.

The vapor delivery system B consists of ¼ inch stainless steel tubing attached to the lid of the vapor chamber at the point 41. Valves 42 and 43 and tee fittings 44 are used to regulate the gas flows and allow the addition of other halide vapors to the system. These other halide vapors can be, for example, silicon tetrachloride. A typical application involves passage of the vapors into a gas-oxygen flame 45 where they hydrolyze to form oxides. These oxides can be seen from the following equations:

$$SiCl_4 + 2H_2O \quad SiO_2 + HCl$$

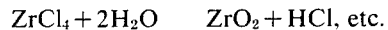
$$ZrCl_4 + 2H_2O \quad ZrO_2 + HCl, \text{ etc.}$$

A stream of finely divided particles 46 is produced downstream of the flame to be deposited on suitable substrates such as the aforementioned mandrel. In the present case, silicon tetrachloride is used as the major constituent in forming an $SiO_2$ soot on the mandrel.

The entire delivery system from point 41 to the burner 15 is wrapped in an insulating cloth (not shown) such as asbestos. Over this is wound a heavy duty heating tape (not shown). This technique insures that the lines will be maintained at a high enough temperature to eliminate condensation of the vapors and subsequent plugging. The temperatures in the delivery lines, vapor generator, and burner are monitored and controlled by thermocouples shown located at points 47 and 48.

During a typical run, liquid silicon tetrachloride is heated in a container to 35°C. and oxygen is bubbled through it as shown at D. The vapors are carried by a heated delivery system (heated between 45° and 50° C.) to valve 43. If blanks are being made for use as core members in optical waveguides, the blanks are doped usually with zirconium to raise the refractive index of the core member. In this case, zirconium tetrachloride as a powder is loaded into the chamber in a dry box, and the above described chamber is sealed shut. The delivery lines are attached and the unit is placed in the tube furnace as shown in FIG. 5. Valves 42 and 43 are kept closed while the entire system is heated up. When the chamber reaches 250°C., the delivery line 300°C. and the burner 275°C., the burner flame is lit for hydrolysis of the vapor and the valve 42 is opened. A carrier gas which in one case is dry oxygen, is turned on and enters the chamber inlet tube at the point 49. In one specific embodiment, a flow rate of 2,900 cc. per minute is used. This carrier gas is preheated by the coils 37 and enters the chamber. As it passes through the screens covered with zirconium tetrachloride powder, it picks up zirconium tetrachloride vapors. The stream then passes into the delivery line at 41 and is transported past the tee fitting at 44 and into the burner. A second vapor may be added at the input 50 passing through the valve 43 and mixing with the zirconium tetrachloride vapors at 44. For example, when a stream of dry oxygen, saturated with silicon tetrachloride vapor is added at 50, at a flow rate of for instance 1,700 cc/min, then the resultant soot mixture obtained from the hydrolysis at 46 contains approximately 4.0 weight percent zirconium oxide and 96.0 weight percent of silicon dioxide. This finely divided soot mixture can be consolidated into a good quality doped fused silica by heating it in the induction furnace shown in FIG. 2.

If only the $SiCl_4$ stream is allowed through to burner 48 (valve 42 is shut), then the resultant blank will be pure vitreous silica. In another embodiment, if liquid chlorides such as $TiCl_4$ are mixed with the $SiCl_4$ as described by Nordberg, then the resultant blank will be a $TiO_2$ doped silica glass. Other liquid chlorides which can be satisfactorily employed as dopants are $SnCl_4$, $GeCl_4$ and $PCl_3$.

CONCLUSION

It can be seen that an important portion of the invention relates to the slow insertion of the aforementioned preform into an extremely hot furnace so that gradient sintering is accomplished in which the gas in the porous preform is permitted to be pushed out of the porous preform during sintering so as to eliminate gas bubbles and consequent pockets in the finished crucible or blank. The atmosphere is inert to prevent bubble formation and to permit the dissolving of any gas bubbles into the fused silica where they do no harm. In addition, because the temperature of the furnace is much above that which is normally associated with sintering, more complete sintering occurs and therefore much less unsintered particulate matter occurs in the final product. Finally and most importantly, because of the relative closeness of the burner to the mandrel and because only a single high purity graphite mandrel is used or low expansion refractory material, a dense compact soot is formed which minimizes shrinkage, peeling and cracking and permits the formation of large-sized blanks or crucibles.

What is claimed is:

1. A method of forming a blank of fused silica of high optical quality in which an amount of glassy soot is deposited on a mandrel comprising the steps of:

depositing onto a non-metallic, dense, mandrel, having a thermal expansion characteristic less than $\alpha_{0-1000} \cong 30 \times 10^{-7}/°C$, and a melting point above approximately 1,400°C., a glassy soot formed by flame hydrolysis of a hydrolyzable silicon compound so as to form a preform, the burner used in said flame hydrolysis being sufficiently close to said mandrel such that said mandrel is well within the outer cone portion of the flame from said burner, said mandrel being translated and rotated for depositing a uniform dense soot;

gradually inserting the mandrel on which said soot has been deposited into a furnace having a non-reactive atmosphere, said mandrel being inserted at a rate sufficient to sinter said soot and at a rate which permits entrapped gas to escape through portions of said soot not in the hot zone of said furnace as said soot is sintered and shrinks around said mandrel; and removing said mandrel from said furnace once all of said soot is sintered; whereby an optically transparent fused silica blank is formed which is water-free and free of bubbles.

2. The method as recited in claim 1 wherein said process is carried out with a single mandrel thus preventing contamination by substitution of mandrels after preform formation, whereby the use of a single mandrel and the density of the soot on said mandrel due to the placement of said mandrel in said outer cone prevents cracking and excessive shrinking.

3. The method as recited in claim 2 wherein said mandrel is made of graphite.

4. The method as recited in claim 3 wherein said graphite has a maximum of 0.01 percent ash, thereby anabling the production of a high quality preform.

5. The method as recited in claim 2 wherein said mandrel is made from crystalline refractory ceramic which has a low expansion characteristic and which is dense.

6. The method as recited in claim 1 wherein said mandrel is made of fused quartz.

7. The method as recited in claim 1 wherein said sintering takes place in an inert atmosphere selected from the group of gases consisting of the inert gases and nitrogen.

8. The method recited in claim 1 further comprising:

quickly removing said mandrel from said furnace once all of said soot is sintered, whereby said method is performed without the necessity of reheating said preform after sintering in order to provide an optically transparent water-free blank free of bubbles.

9. In a method of forming a blank of fused silica of high optical quality in which an amount of glassy soot is deposited by flame hydrolysis on a dense non-metallic mandrel, having a thermal expansion characteristic less than $\alpha_{0-1000} \cong 30 \times 10^{-7}/°C$, and a melting point above approximately 1,400°C, the improvement comprising the steps of:

gradually inserting the mandrel with said glassy soot into a furnace operating with a dry inert atmosphere which does not react with said furnace or said blank at a temperature sufficient to sinter said soot, said mandrel being inserted at a speed which permits entrapped gas to be squeezed out through portions of said soot not in the furnace hot zone as said soot is sintered and shrinks around said mandrel, and quickly removing said mandrel from said furnace once all of said soot is sintered, whereby an optically transparent fused silica is formed thereby which is water-free and free of bubbles, due to said slow insertion and inert atmosphere.

10. The method as recited in claim 9 wherein said gradual insertion of soot and mandrel takes place at between 0.1 and 1.0 inches per minute.

11. The method as recited in claim 9 wherein said soot is deposited by flame hydrolysis of a halide in an oxygen carrier gas.

12. The method as recited in claim 11 and further including the steps of adding a dopant selected from the group consisting of:

zirconium, tin, germanium, phosphorus, tantalum, titanium, aluminum, tungsten, molybdenum, beryllium, and niobium to said soot, whereby the resulting fused silica contains said dopant.

13. The method as recited in claim 12 wherein said dopant is added to the gas utilized in said flame hydrolysis prior to reacting the resulting composite gas in the burner used for flame hydrolysis, said dopant being in the form of a gas formed by taking the chloride form of said dopants and psssing dry gas therethrough.

14. The method as recited in claim 13 and further including the steps of depositing said soot by flame hydrolysis in which the burner for said deposition is positioned such that said mandrel is well within the outer cone portion of the flame produced by said burner, and rotating and translating said mandrel as said soot is deposited, whereby an extremely dense layer of soot is formed on said mandrel thus minimizing shrinkage, peeling and cracking and permitting large-sized blanks to be made.

* * * * *